United States Patent [19]

Chang et al.

[11] Patent Number: 4,937,425

[45] Date of Patent: Jun. 26, 1990

[54] METHOD OF MAKING A POLARIZING PARABOLIC DISH ANTENNA REFLECTOR

[75] Inventors: Stanley S. Chang, Palos Verdes Estates; Flora Yeung, Agoura Hills, both of Calif.

[73] Assignee: Hughes Aircraft Company, Los Angeles, Calif.

[21] Appl. No.: 400,299

[22] Filed: Aug. 29, 1989

[51] Int. Cl.$^5$ ............................................. B23K 26/00
[52] U.S. Cl. ................................. 219/121.6; 29/600; 219/121.85; 219/121.8; 219/121.69; 343/756; 343/840; 343/909
[58] Field of Search ....................... 219/121.68, 121.69, 219/121.6, 121.65, 121.66, 121.85, 121.78, 121.8; 343/756, 840, 909; 29/600

[56] References Cited

U.S. PATENT DOCUMENTS

| | | | |
|---|---|---|---|
| 4,001,836 | 1/1977 | Archer et al. | 343/756 |
| 4,286,250 | 8/1981 | Sacchetti | 219/121.6 X |
| 4,691,091 | 9/1987 | Lyons et al. | 219/121.6 X |
| 4,694,138 | 9/1987 | Dodaira et al. | 219/121.85 |
| 4,757,323 | 7/1988 | Duret et al. | 343/909 |

Primary Examiner—C. L. Albritton
Attorney, Agent, or Firm—Steven M. Mitchell; Robert A. Westerlund; Wanda Denson-Low

[57] ABSTRACT

A method of fabricating a polarizing dish antenna reflector (10) wherein a light source (22) is employed to pyrolyze an organometallic compound (14) disposed on the antenna surface to form grid elements (24) directly thereon. The surface of the parabolic dish antenna reflector (10) is coated with an organometallic compound (14) that comprises a metallic component such as gold, silver, copper chrome, or other suitable metal. The coated surface may be conditioned by depositing a surface film of polyimide, or the like. The coated surface is then pyrolyzed by using a high intensity focussed light source (22), such as a laser or discharge lamp to form metal grid lines (24) on the surface. The light source (22) is scanned across the surface to create parallel scan lines, or the light source may be fixed and the reflector surface can be moved relative to the light source (22) using a computer controlled XY table (16), or the like. The focussed light pyrolyzes the organometallic compound (14) and volatilizes the organic portion thereof, leaving metal traces disposed on the reflector surface. Once all the grid lines are formed, the reflector (10) is rinsed in appropriate solvents to remove excess organometallic compound.

21 Claims, 1 Drawing Sheet

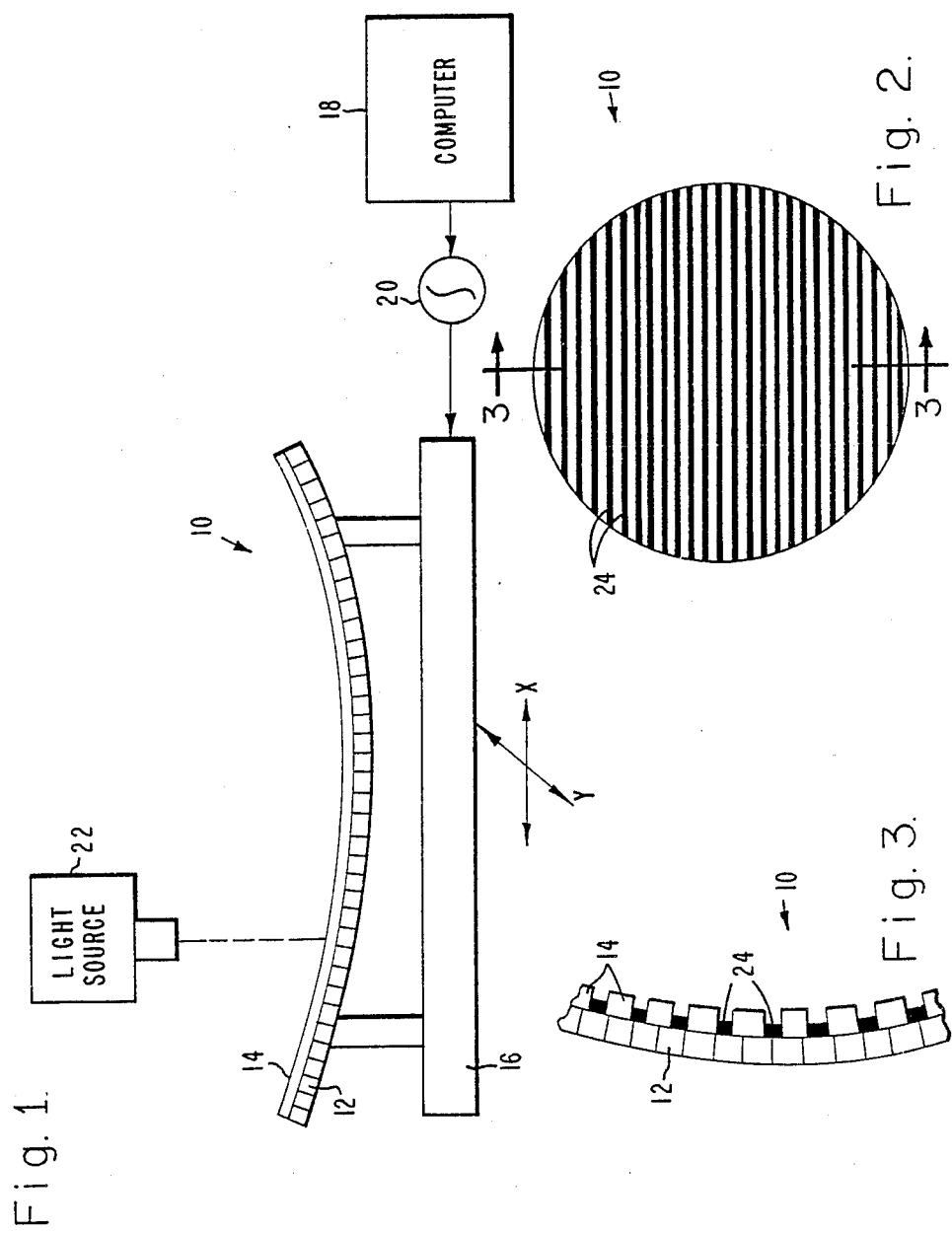

METHOD OF MAKING A POLARIZING PARABOLIC DISH ANTENNA REFLECTOR

BACKGROUND

The present invention relates generally to polarizing dish antenna reflectors, and more particularly to a method of making a polarizing dish antenna reflector wherein a light source is employed to pyrolyze an organometallic compound disposed on the antenna surface to form grid elements directly on the reflector surface.

The current state of the art in forming parabolic dish antenna reflectors is evidenced in U.S. Pat. No. 4,001,836, wherein such reflectors are formed by fabricating the grid elements by means of a photoetching process. The grid comprises a multiplicity of electrically conductive grid elements which extend across the reflector surface formed from relatively thin flexible sheet material. The grid may be formed by laying wires or narrow metallic strips across the reflector surface and bonding the wires or strips to the surface to form the grid elements. Also the photoetching process may be employed wherein the grid elements are formed on a planar segmented structure which in then formed into a parabolic segmented structure by bonding. Thus, the reflector is comprised of an assembly of curved strip-like segments shaped in accordance with certain parametric equation, when the strips are assembled, the resulting grid structure has edges of the strips lying parallel or perpendicular to the direction of polarization.

The antenna of U.S. Pat. No. 4,001,836 is made by means of a complex process and is costly to fabricate. There is therefore a need to provide a method of fabricating a parabolic dish antenna reflector which is more economical, is lighter in weight than conventional designs, and is more resistant to thermal distortion.

SUMMARY OF THE INVENTION

In order to overcome the limitations of conventional parabolic dish antenna reflector manufacturing processes, the present invention provides for a method of fabricating a polarizing parabolic dish antenna reflector wherein a light source is employed to pyrolyze an organometallic compound disposed on the antenna surface to form grid elements directly on the reflector surface.

The method of the present invention comprises the following steps. The first step comprises providing a parabolic dish antenna surface. The surface is a nonconducting material, such as Kevlar epoxy composite, or the like. This surface functions as the reflector shell. The antenna surface is then coated with an organometallic compound, which includes a metallic component such as gold, silver, copper chrome, or other suitable metal material. The reflector surface may be conditioned by depositing a layer of thin polymeric film, such as polyimide, or the like, to improve the adhesion of the reflector surface to the organometallic compound.

The coated surface is then pyrolyzed by using a focussed light source, such as a laser or light from a discharge lamp to form metal grid lines on the surface. The light source may be scanned across the surface to create parallel scan lines, or the light source may remain stationary and the antenna surface may by moved relative to the light source using a computer controlled XY table, for example. The focussed light pyrolyzes the organometallic compound and volatilizes the organic portion thereof, leaving metal grid lines disposed on the antenna surface. Once all the grid lines are formed, the antenna is rinsed in solvents to remove the excess organometallic compound. Typical of such rinsing solvents include xylene, or the like, followed by a water rinse.

The above method is economical, in that it uses relatively inexpensive processing techniques to coat, treat and remove materials from the surface of the antenna reflector. Also, the method is repeatable, and can be controlled by a computer driven light source to scan the reflector or control the XY table. The grid lines are directly formed on the reflector surface, and thus there are no additional steps required to fabricate the reflector as in the method disclosed in U.S. Pat. No. 4,001,836, for example.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIGS. 1 through 3 illustrate methods of fabricating parabolic dish antenna reflectors in accordance with the principles of the present invention.

DETAILED DESCRIPTION

Referring to FIG. 1, a polarizing parabolic dish antenna reflector 10 which is in the process of fabrication utilizing one of the processes in accordance with the present invention is shown. The reflector 10 is comprised of a reflector shell 12 which is generally made of a composite material such as Kevlar epoxy composite, or the like. The reflector shell 12 is coated with an organometallic compound 14 containing a metallic component which comprises the reflective material of the reflector 10. Typical of such an organometallic compound 14 is copper resinate, or the like, or any other compound containing such metals as gold, silver, aluminum or chromium, for example. In addition, the reflector shell 12 may be conditioned by depositing a polyimide film, for example, on top of the surface of the reflector shell 12 prior to the deposition of the coating of organometallic material 14. The reflector shell 12 is typically conditioned for the purpose of improving the adhesion of the organometallic compound to its surface.

The coated reflector shell 12 is positioned on an XY positioning table 16, for example, whose position is controlled by means of a computer 18 and servo control system 20, for example, in a conventional manner. The XY positioning table 16 is adapted to accurately position the coated shell 12 with respect to a light source 22. Typically, a laser light source 22 or other high intensity source such as a discharge lamp, for example, may be employed. Alternatively, the coated shell 12 may be positioned at a fixed location and the light source may be optically or mechanically scanned across the surface of the coated reflector shell 12.

Using the XY table 16 in conjunction with a mask and stepping stage, for example, to generate a repeating pattern, the organometallic material 14 is vaporized by absorption of the light from the light source 22 to create metallic traces 24 shown in FIG. 2. Alternatively, by utilizing the laser light source 22, for example, and linearly scanning its focussed beam a successive number of times across the surface of the coated shell 12, the metallic traces 24 may also be formed.

The interaction of the high intensity light with the organometallic compound vaporizes the compound and dissociates the metal from its volatile constituents. The interaction of the scanning high intensity light source and the compound leaves metallic traces 24 which adhere to the surface of the shell 12 as is shown in FIGS. 2 and 3. FIG. 2 shows a top view of the scanned reflector 10 illustrating the trace pattern provided by the methods of the present invention. FIG. 3 shows a side view of the reflector 10 of FIG. 2. As shown in FIG. 3, fine line metallic traces 24 are disposed between unmetallized portions of the organometallic compound 14. Once all of the grid lines are fabricated, the reflector 10 is rinsed in solvents, such as xylene and water, for example, to remove any excess organometallic compound 14 from the surface of the reflector 10.

The metallic traces 24 formed by the methods of the present invention are made parallel to the direction of anticipated radiation propagation without the need for sophisticated mechanical arrangements to form the completed reflector, such as is evidenced in U.S. Pat. No. 4,001,836. The line width of the metallic traces 24 are typically a function of the focussing conditions and intensity of the light source 22 and the particular organometallic compound 14 used as the coating material. A line width of 5 millimeters is typically achieved using a Argon ion laser and an organometallic compound 14 comprising copper resinate, for example.

Thus, the present invention provides for the fabrication of polarizing grid elements directly on the surface of the reflector 10. This is a fast and economical fabrication method for fabricating polarizing reflectors 10. The grid elements are deposited directly on the reflector surface and are precisely spaced and positioned relative to one another. In addition, the mass of the reflector 10 remains substantially unchanged during the fabrication process. This is quite important to designers who intend to incorporate such reflectors in space applications, or other mass-sensitive applications.

Utilizing computer controlled scanning techniques or positioning arrangements, different grid patterns for frequency selection can be programmed within a short time period. The present invention also eliminates the need for special handling techniques required for photo-etched films and adhesives employed in conventional reflector fabrication methods.

Thus there has been described a new and improved method of making a polarizing dish antenna reflector wherein a light source is employed to pyrolyze an organometallic compound disposed on the antenna surface to form grid elements directly thereon. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of fabricating a polarizing parabolic dish antenna reflector which comprises the steps of:
providing a parabolic dish antenna surface;
coating the surface with an organometallic compound;
pyrolyzing the coated surface using a focussed light source to form metal grid lines thereon; and
removing excess organometallic compound from the surface.

2. The method of claim 1 wherein the pyrolyzing step comprises the step of:
scanning a focussed light source across the surface a plurality of times to form the grid lines.

3. The method of claim 1 wherein the pyrolyzing step comprises the steps of:
providing a focussed light source; and
moving the coated surface relative to the light source to pyrolyze the organometallic compound and form the grid lines.

4. A method of fabricating a metallic antenna reflector comprising the steps of:
providing an antenna surface;
coating the antenna surface with an organometallic compound; and
scanning a focussed light source across the coated antenna surface to convert the organometallic compound into a metal film comprising a plurality of grid lines on the antenna surface.

5. The method of claim 4 which further comprises the step of:
removing excess organometallic compound from the surface after formation of the plurality of grid lines.

6. The method of claim 4 wherein the removing step comprises the step of:
removing excess organometallic compound from the surface by rinsing the antenna surface in solvent.

7. A method of fabricating a polarizing parabolic dish antenna reflector which comprises the steps of:
providing a parabolic dish antenna surface;
coating the surface with an organometallic compound; and
pyrolyzing the coated surface using a focussed light source to form metal grid lines on the surface.

8. The method of claim 7 which further comprises the step of:
removing excess organometallic compound from the surface.

9. The method of claim 7 wherein the pyrolyzing step comprises the steps of:
scanning a focussed light source across the surface a plurality of times to form the grid lines.

10. The method of claim 7 wherein the pyrolyzing step comprises the steps of:
providing a focussed light source; and
moving the coated surface relative to the light source to pyrolyze the organometallic compound and form the grid lines.

11. A method of fabricating a dish antenna reflector which comprises the steps of:
providing a dish antenna surface;
coating the surface with an organometallic compound;
pyrolyzing the coated surface using a focussed light source to form metal grid lines on the surface; and
removing excess organometallic compound from the surface.

12. The method of claim 11 wherein the pyrolyzing step comprises the steps of:
scanning a focussed light source across the surface a plurality of times to form the grid lines.

13. The method of claim 11 wherein the pyrolyzing step comprises the steps of:
providing a focussed light source; and moving the coated surface relative to the light source to pyrolyze the organometallic compound and form the grid lines.

14. A method of fabricating a dish antenna reflector which comprises the steps of:
providing a dish antenna surface;
coating the surface with an organometallic compound; and
pyrolyzing the coated surface using a focussed light source to form metal grid lines on the surface.

15. The method of claim 14 which further comprises the step of:
removing excess organometallic compound from the surface.

16. The method of claim 14 wherein the pyrolyzing step comprises the steps of:
scanning a focussed light source across the surface a plurality of times to form the grid lines.

17. The method of claim 14 wherein the pyrolyzing step comprises the steps of:
providing a focussed light source; and
moving the coated surface relative to the light source to pyrolyze the organometallic compound and form the grid lines.

18. A polarizing parabolic dish antenna reflector fabricated by a method comprising the steps of:
providing a parabolic dish antenna surface;
coating the surface with an organometallic compound;
pyrolyzing the coated surface a focussed light source to form metal grid lines thereon; and
removing excess organometallic compound from the surface.

19. The reflector fabricated by the method of claim 1 wherein the pyrolyzing step comprises the step of:
scanning a focussed light source across the surface a plurality of time to form the grid lines.

20. The reflector fabricated by the method of claim 1 wherein the pyrolyzing step comprises the steps of:
providing a focussed light source; and
moving the coated surface relative to the light source to pyrolyze the organometallic compound and form the grid lines.

21. A metallic antenna reflector fabricated by a method comprising the steps of:
providing an antenna surface;
coating the antenna surface with an organometallic compound; and
scanning a focussed light source across the coated antenna surface to convert the organometallic compound into a metal film comprising a plurality of grid lines on the antenna surface.

* * * * *